US008792326B2

(12) United States Patent
Nagaraja (10) Patent No.: US 8,792,326 B2
(45) Date of Patent: *Jul. 29, 2014

(54) RANGING AND DISTANCE BASED WIRELESS LINK SPECTRUM SELECTION

(75) Inventor: Nagendra Nagaraja, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 458 days.

This patent is subject to a terminal disclaimer.

(21) Appl. No.: 12/767,301

(22) Filed: Apr. 26, 2010

(65) Prior Publication Data

US 2011/0261765 A1     Oct. 27, 2011

(51) Int. Cl.
*H04L 12/64* (2006.01)
*H04W 72/04* (2009.01)
*H04L 5/00* (2006.01)
*H04W 84/12* (2009.01)

(52) U.S. Cl.
CPC ........... *H04W 72/048* (2013.01); *H04L 5/0064* (2013.01); *H04L 5/0085* (2013.01); *H04L 5/0044* (2013.01); *H04L 5/006* (2013.01); *H04W 84/12* (2013.01); *H04L 5/0007* (2013.01); *H04L 5/0037* (2013.01)
USPC ....................... 370/208; 370/395.42; 370/352

(58) Field of Classification Search
USPC ................ 370/328, 344, 341, 437, 445, 203, 370/208–210, 352, 356, 331; 455/451, 455/452.1, 453, 455, 450
See application file for complete search history.

(56) References Cited

U.S. PATENT DOCUMENTS

| | | | |
|---|---|---|---|
| 6,721,569 B1 | 4/2004 | Hashem et al. | |
| 7,136,655 B2 * | 11/2006 | Skafidas et al. | 455/450 |
| 7,266,108 B2 * | 9/2007 | Sato et al. | 370/343 |
| 7,599,686 B2 * | 10/2009 | Quinn et al. | 455/423 |
| 7,738,874 B1 * | 6/2010 | Sill et al. | 455/441 |
| 7,929,963 B2 | 4/2011 | Cho et al. | |
| 7,929,990 B2 | 4/2011 | Tomioka et al. | |
| 7,958,041 B2 | 6/2011 | Stanforth et al. | |
| 7,965,641 B2 | 6/2011 | Ben et al. | |

(Continued)

FOREIGN PATENT DOCUMENTS

| | | |
|---|---|---|
| EP | 1261228 A2 | 11/2002 |
| EP | 1418776 A1 | 5/2004 |
| EP | 1705818 A1 | 9/2006 |
| WO | 2004045228 | 5/2004 |

OTHER PUBLICATIONS

International Search Report and Written Opinion—PCT/US2011/033882—ISA/EPO—Oct. 11, 2011.

(Continued)

*Primary Examiner* — Hanh N Nguyen
(74) *Attorney, Agent, or Firm* — Stanton Braden (57) ABSTRACT

A method and apparatus for performing spectral allocation for a wireless link in a wireless communication system is disclosed. The method determines a distance/range for the wireless link and assigns an optimal sub-carrier frequency to the wireless link based on (1) a higher frequency to lower frequency priority and (2) on the value of the distance/range of the wireless link. Higher frequency sub-carriers are assigned to wireless links that have a shorter distance/range and lower frequency sub-carriers are assigned to wireless links that have a longer distance/range. The method of the present work increases the spectral efficiency of the wireless communication system and improves system bandwidth.

20 Claims, 5 Drawing Sheets

(56) References Cited

U.S. PATENT DOCUMENTS

| | | |
|---|---|---|
| 8,000,715 B2 | 8/2011 | Melpignano et al. |
| 8,140,085 B2 | 3/2012 | Chaudhri et al. |
| 8,249,966 B2 | 8/2012 | Stanforth et al. |
| 8,254,902 B2 | 8/2012 | Bell et al. |
| 2004/0096052 A1 | 5/2004 | Liu |
| 2007/0223920 A1* | 9/2007 | Moore et al. .................... 398/38 |
| 2008/0117871 A1 | 5/2008 | Olexa et al. |
| 2008/0170539 A1 | 7/2008 | Hyon et al. |
| 2010/0142458 A1 | 6/2010 | Mark |
| 2010/0248760 A1 | 9/2010 | Li et al. |
| 2011/0263206 A1* | 10/2011 | Nagaraja ......................... 455/62 |

OTHER PUBLICATIONS

Martin, F.L., et al., "Early Opportunities for Commercialization of TV Whitespace in the U.S (invited paper)," CR0WNC0M 2008 3rd International Conference on Cognitive Radio Oriented Wireless Networks and Communications. IEEE, Piscataway, NJ, USA, (May 15, 2008), pp. 1-5, XP031285137, ISBN: 978-1-4244-2301-9.

* cited by examiner

RANGING AND DISTANCE BASED WIRELESS LINK SPECTRUM SELECTION

BACKGROUND

1. Field

The present work relates generally to digital communication systems, and more specifically to the implementation of Wi-Fi in the public broadband.

2. Background

The Federal Communications Commission (FCC) has ruled that television (TV) white space will be allowed to be used for public broadband after the United States has abandoned analog television broadcasting in 2009. The term "white space" refers to portions of the television spectrum that are located between ultra high frequency (UHF) television channels. The white space portions of the television spectrum were originally set up as a buffer zone to protect the analog television channels from stray signals and other interference. Now that analog television technology has been abandoned in favor of digital television technology, the white space spectrum is no longer needed to provide analog television buffer zones and is available for other uses.

The FCC decision has made two widely separated spectrum frequency groups available for public broadband akin to Wi-Fi and its variants. These spectrum groups comprise 700 MHz (TV white space), 5 GHz and 2.5 GHz. Considering that these frequency groups are widely separated, the most appropriate spectrum must be selected at given points in time. Sub-optimal efficiency results in low spectral efficiency and creates inter-device incompatibility.

Traditional wireless protocols that are currently in use implement Channel Impulse Response (CIR) based spectrum allocation. Fixed spectral allocation is also known. Neither method is efficient where frequency groups are widely separated. CIR based allocation may allocate a lower frequency group all of the time because lower frequency channels will have good CIR for both shorter and longer distance links. However, higher frequency channels do not have good CIR for longer ranges/distances.

If lower frequency channels are reserved for longer ranges and higher frequency channels are reserved for shorter ranges, higher spectral efficiency can be achieved.

There is therefore a need in the art for spectrum selection based on range and distance.

DETAILED DESCRIPTION

The word "exemplary" is used herein to mean "serving as an example, instance, or illustration." Any embodiment described herein as "exemplary" is not necessarily to be construed as preferred or advantageous over other embodiments.

A 700 MHz band has good distance property as compared to the 2.5 GHz and 5 GHz bands. 700 MHz can provide a range of up to one (1) mile as compared to one hundred meters (100 m) of Wi-Fi deployment at higher frequencies. Since all three bands (700 MHz, 2.5 GHz, 5 GHz) will be used for deployment, their co-existence is very important. Wireless channels have the property that lower frequencies have a longer distance of propagation than higher frequencies. The disclosed embodiments exploit this property to allocate higher frequency sub-carriers for links with shorter ranges and lower frequency sub-carriers for links with longer ranges. This provides a net benefit of increased system spectral efficiency, as opposed to prior art techniques where frequency allocation is chosen according to inefficient Channel Impulse Response (CIR) criteria. CIR selection is inefficient because for shorter ranges both channel impulse responses will be good, and lower frequency carrier allocation also degrades system bandwidth. Thus, using ranging information to measure the distance of the link and then assigning the best suited sub-carrier is more efficient and provides a greater throughput for the system.

Figure 1:
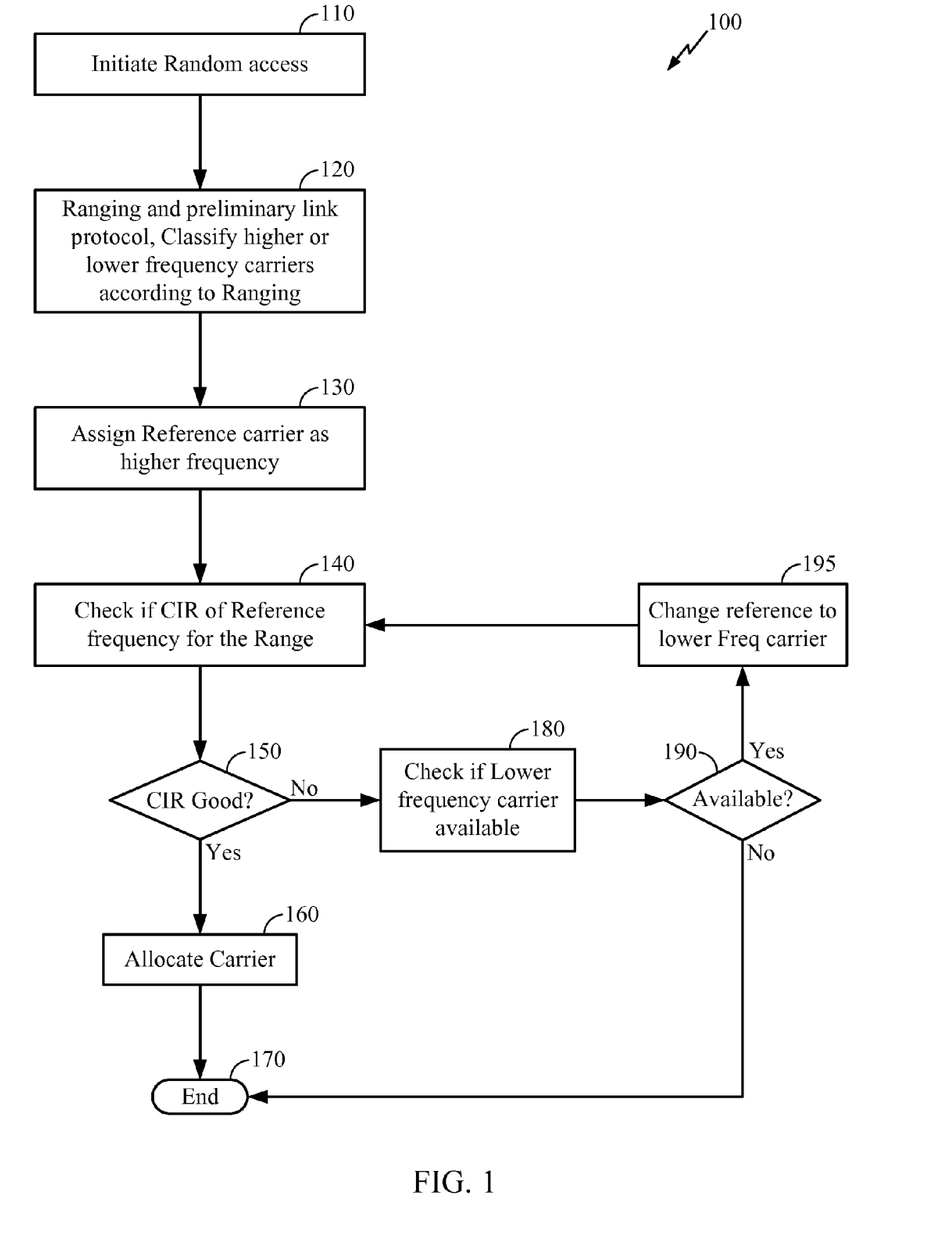
FIG. 1 illustrates an exemplary flow chart of a method that provides distance based frequency spectrum allocation in Wi-Fi in accordance with the present work.

FIG. 1 illustrates an exemplary flow chart 100 for distance based frequency spectrum allocation in Wi-Fi. In a first step of the method a random access process is initiated (step 110). Then a ranging and preliminary link protocol is performed in which the higher and lower frequency sub-carriers are classified according to the distance/range information (also referred to as ranging information) (step 120). The next step of the method then assigns the reference sub-carrier as the higher frequency sub-carrier (step 130). Then the next step of the method determines the Channel Impulse Response (CIR) of the reference sub-carrier frequency for the distance/range (step 140).

Then a decision step is performed to determine if the value of Channel Impulse Response (CIR) is an acceptable value (step 150). If the Channel Impulse Response (CIR) has an acceptable value then the reference sub-carrier frequency is allocated (step 160) and the method ends (step 170).

If the decision step of 150 determines that the Channel Impulse Response does not have an acceptable value then a step is performed to determine if there is a lower frequency sub-carrier available (step 180). Then a decision step is performed to determine if the lower frequency sub-carrier is presently available for use (step 190). If the lower frequency sub-carrier is not presently available for use the method ends (step 170). If the lower frequency sub-carrier is presently available for use, then the reference sub-carrier is changed to the lower frequency sub-carrier (step 195). The method then passes control to step 140 where the Channel Impulse Response (CIR) of the reference frequency for the distance/range is determined (step 140) and the method continues.

The method of frequency allocation that is described with reference to FIG. 1 assigns a sub-carrier (1) based on higher frequency to lower frequency priority, and (2) based on distance/range information. Prior art methods do not do this. In prior art methods that are used in cellular communication and wireless local area networks (WLANs) there is no rule that assigns a sub-carrier based on higher frequency to lower frequency priority. Further, there is no rule or criterion in the prior art for selecting a higher frequency or a lower frequency based on distance/range information.

Consider the following example of selection of a higher frequency or a lower frequency based on distance/range information. When the distance/range is one (1) mile, the higher frequency will have the value of 700 MHz and there will be no lower frequency sub-carrier. This means that the highest frequency that is optimal for a one (1) mile link is 700 MHz. When the distance/range is one hundred meters (100 m), the higher frequency carriers are the 2.5 GHz band carrier and the 5 GHz band carrier and the lower frequency carrier is the 700 MHz band carrier. This means that the highest frequency possible for the one hundred meter (100 m) distance/range is 5 GHz.

The method of the present work classifies sub-carriers as lower or higher frequency depending upon distance/range information and then allocates the frequency depending upon Channel Impulse Response (CIR). This approach provides better spectral efficiency for Wi-Fi systems.

Figure 2:
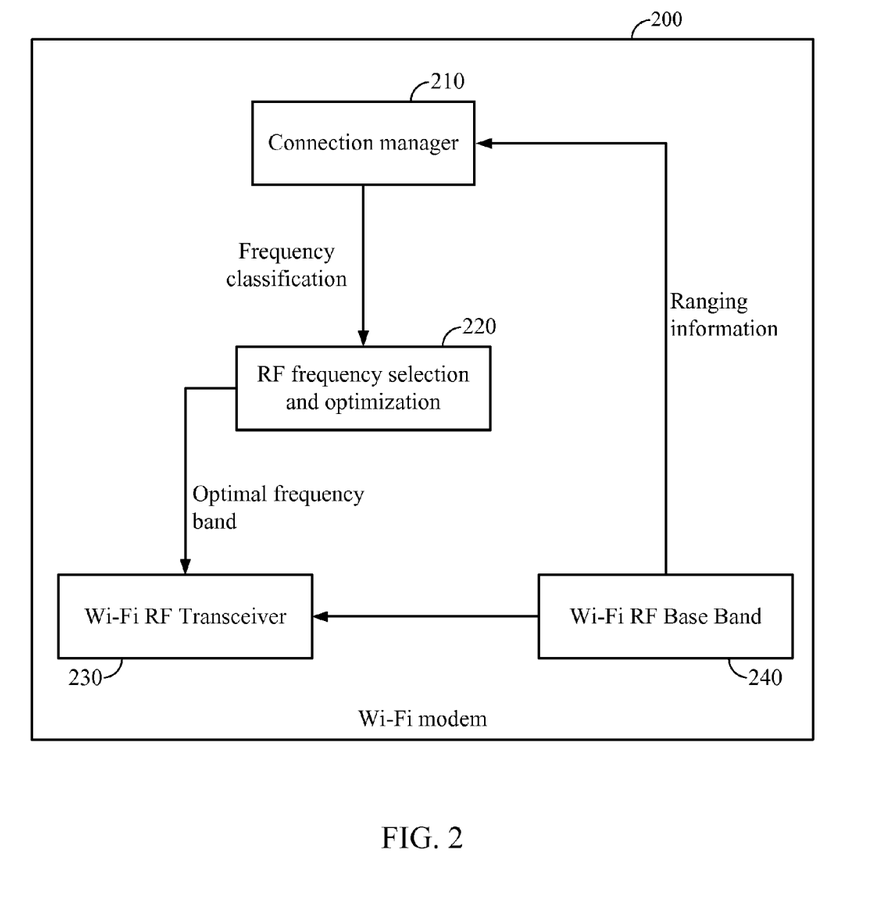
FIG. 2 illustrates an exemplary high level block diagram of a Wi-Fi modem architecture with a connection manager that supports multiple frequency bands depending on ranging in accordance with the present work.

FIG. 2 illustrates an exemplary high level block diagram of a Wi-Fi modem 200 having a Wi-Fi architecture that comprises a connection manager unit 210 that supports multiple frequency bands depending on range information. The Wi-Fi modem 200 also comprises a radio frequency (RF) frequency selection and optimization unit 220, a Wi-Fi radio frequency (RF) transceiver 230 and a Wi-Fi base band unit 240. FIG. 2 illustrates the manner in which the elements of the Wi-Fi modem 200 are connected.

The Wi-Fi base band unit 240 provides signal information to the Wi-Fi transceiver 230. In addition, the Wi-Fi base band unit provides distance/range information (also referred to as ranging information) to the connection manager unit 210. The connection manager unit 210 assigns a frequency carrier (1) based on higher frequency to lower frequency priority, and (2) based on distance/range information in accordance with the principles of the present work. In this manner the connection manager unit 210 supports multiple frequency bands depending upon distance/range information.

The connection manager unit 210 then passes the frequency classification information to the RF frequency selection and optimization unit 220. Based on the frequency classification information that is provided by the connection manager unit 210, the RF frequency selection and optimization unit 220 selects and optimizes the carrier frequency to provide an optimal frequency band for the Wi-Fi RF transceiver 230.

Figure 3:
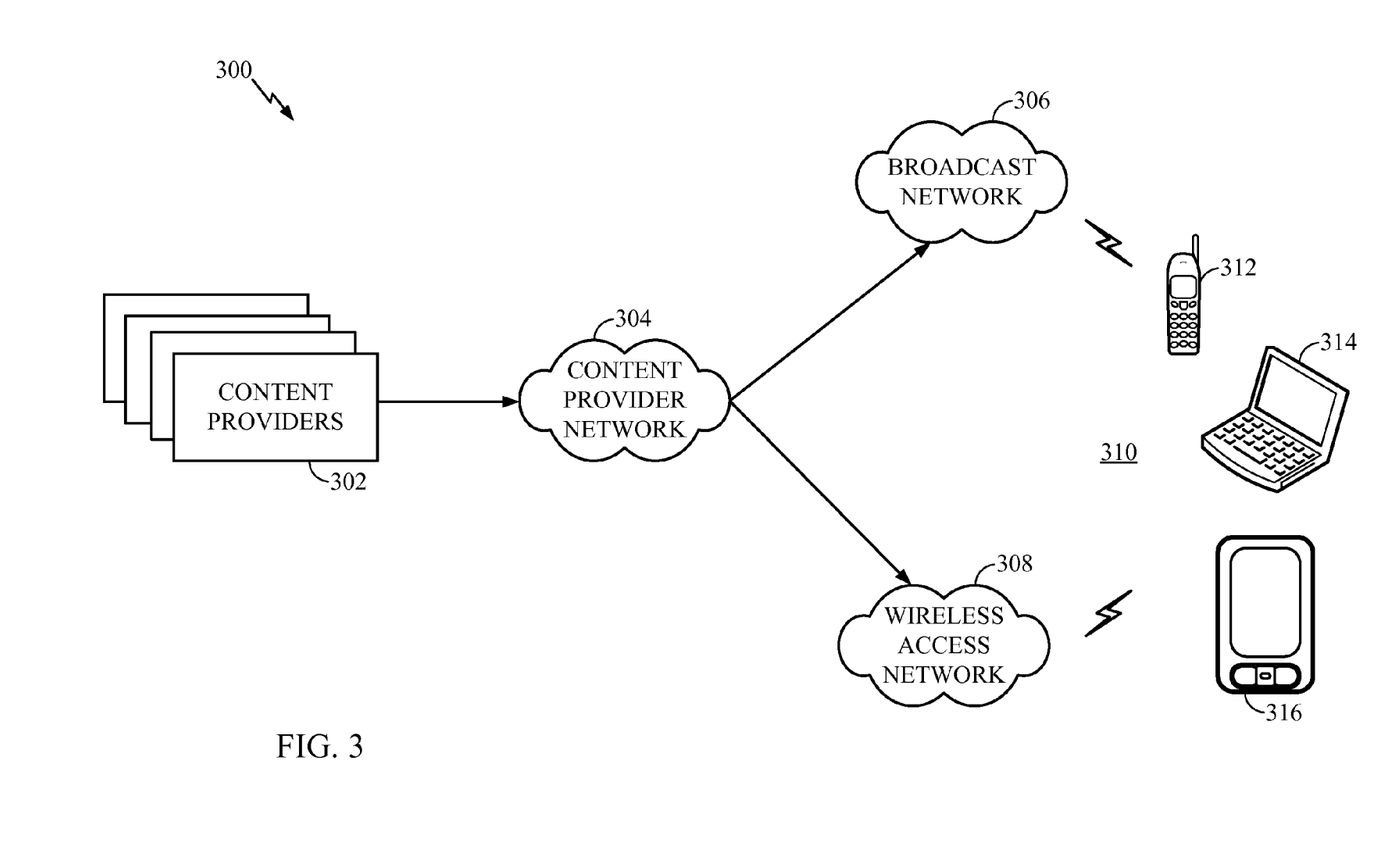
FIG. 3 illustrates a communications system in which principles according to the present work may be incorporated.

FIG. 3 illustrates a communications system 300 in which principles according to the present work may be incorporated. In general, the system 300 creates and broadcasts multimedia content across various networks to a large number of mobile subscribers. The communications system 300 includes any number of content providers 302, a content provider network 304, a broadcast network 306, and a wireless access network 308. The communications system 300 is also shown with a number of devices 310 used by mobile subscribers to receive multimedia content. These devices 310 include a mobile telephone 312, a person digital assistant (PDS) 314, and a laptop computer 316. The devices 310 illustrate just some of the devices that are suitable for use in the communications system 300. It should be noted that although three devices are shown in FIG. 3, virtually any number of analogous devices or types of devices are suitable for use in the communications system 300, as would be apparent to those skilled in the art.

The content providers 302 provide content for distribution to mobile subscribers in the communications system 300. The content may include video, audio, multimedia content, clips, real-time and non real-time content, scripts, programs, data or any other type of suitable content. The content providers 302 provide content to the content provider network for wide-area or local-area distribution.

The content provider network 304 comprises any combination of wired and wireless networks that operate to distribute content for delivery to mobile subscribers. In the example illustrated in FIG. 3, the content provider network 304 distributes content through a broadcast network 306. The broadcast network 306 comprises any combination of wired and wireless proprietary networks that are designed to broadcast high quality content. These proprietary networks may be distributed throughout a large geographic region to provide seamless coverage to mobile devices. Typically, the geographic region will be divided into sectors with each sector providing access to wide-area and local-area content.

The content provider network 304 may also include a content server (not shown) for distribution of content through a wireless access network 308. The content server communicates with a base station controller (BSC) (not shown) in the wireless access network 308. The BSC may be used to manage and control any number of base transceiver stations (BTSs) (not shown) depending on the geographic reach of the wireless access network 308. The BTSs provide access to wide-area and local-area for the various devices 310.

The multimedia content broadcast by the content providers 302 include one or more services. A service is an aggregation of one or more independent data components. Each independent data component of a service is called a flow. By way of example, a cable news service may include three flows: a video flow, an audio flow, and a control flow.

Services are carried over one or more logical channels. In Forward Link Only (FLO) Air Interface applications, a logical channel is often referred to as a Multicast Logical Channel (MLC). A logical channel may be divided into multiple logical sub-channels. These logical sub-channels are called streams. Each flow is carried in a single stream. The content for a logical channel is transmitted through the various networks in a physical frame. In Forward Link Only (FLO) Air Interface applications, the physical frame is often referred to as a superframe.

The air interface used to transmit the physical frames to the various devices 310 shown in FIG. 3 may vary depending on the specific application and the overall design constraints. In general, communications systems employing Forward Link Only (FLO) technology utilize Orthogonal Frequency Division Multiplexing (OFDM), which is also utilized by Digital Audio Broadcasting (DAB), Terrestrial Digital Video Broadcasting (DVB-T), and Terrestrial Integrated Services Digital Broadcasting (ISDB-T). OFDM is a multi-carrier modulation technique that effectively partitions the overall system bandwidth into multiple (N) sub-carriers. These sub-carriers, which are also referred to as tones, bins, frequency channels, etc., are spaced apart at precise frequencies to provide orthogonality. Content may be modulated onto the sub-carriers by adjusting each sub-carrier's phase, amplitude or both. Typically, quadrature phase shift keying (QPSK) or quadrature amplitude modulation (QAM) is used, but other modulation schemes may also be used.

Figure 4:
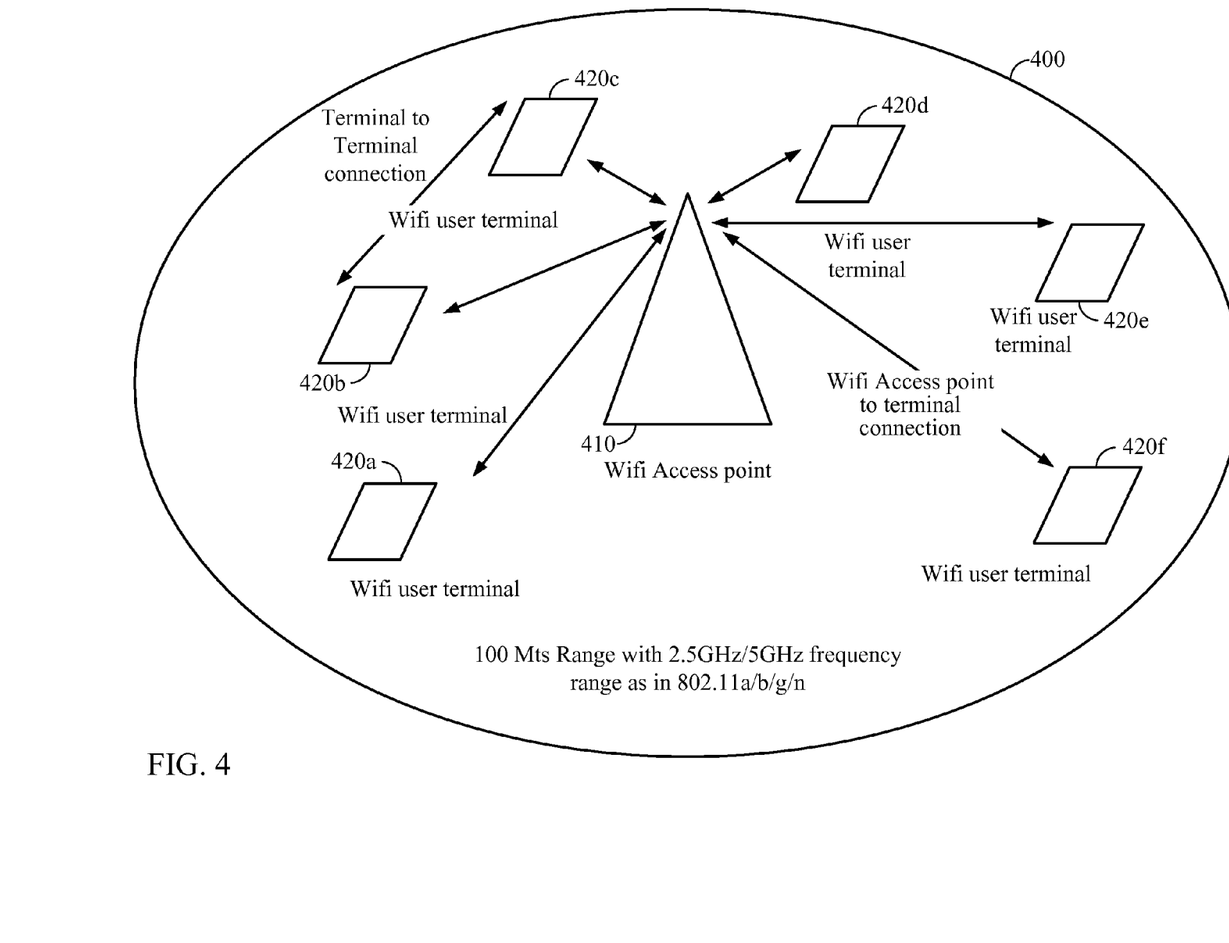
FIG. 4 illustrates a portion of a communications system that comprises a WiFi access point and a plurality of WiFi user terminals that operate within a range of one hundred meters using a prior art method.

The operation of the principles of the present work may be clearly seen from the following example. FIG. 4 illustrates a portion of a communications system 400 that comprises a WiFi access point 410 and a plurality of WiFi user terminals 420 (individually WiFi user terminals 420a through 420f). The WiFi access point 410 and the plurality of WiFi user terminals 420 communicate within a range of one hundred meters (100 m) using a prior art method. As shown in FIG. 4, the WiFi access point 410 communicates with the WiFi user terminals 420 within the one hundred meter (100 m) range with a 2.5 GHz frequency or a 5 GHz frequency as described in the specifications IEEE 802.11a/b/g/n.

Figure 5:
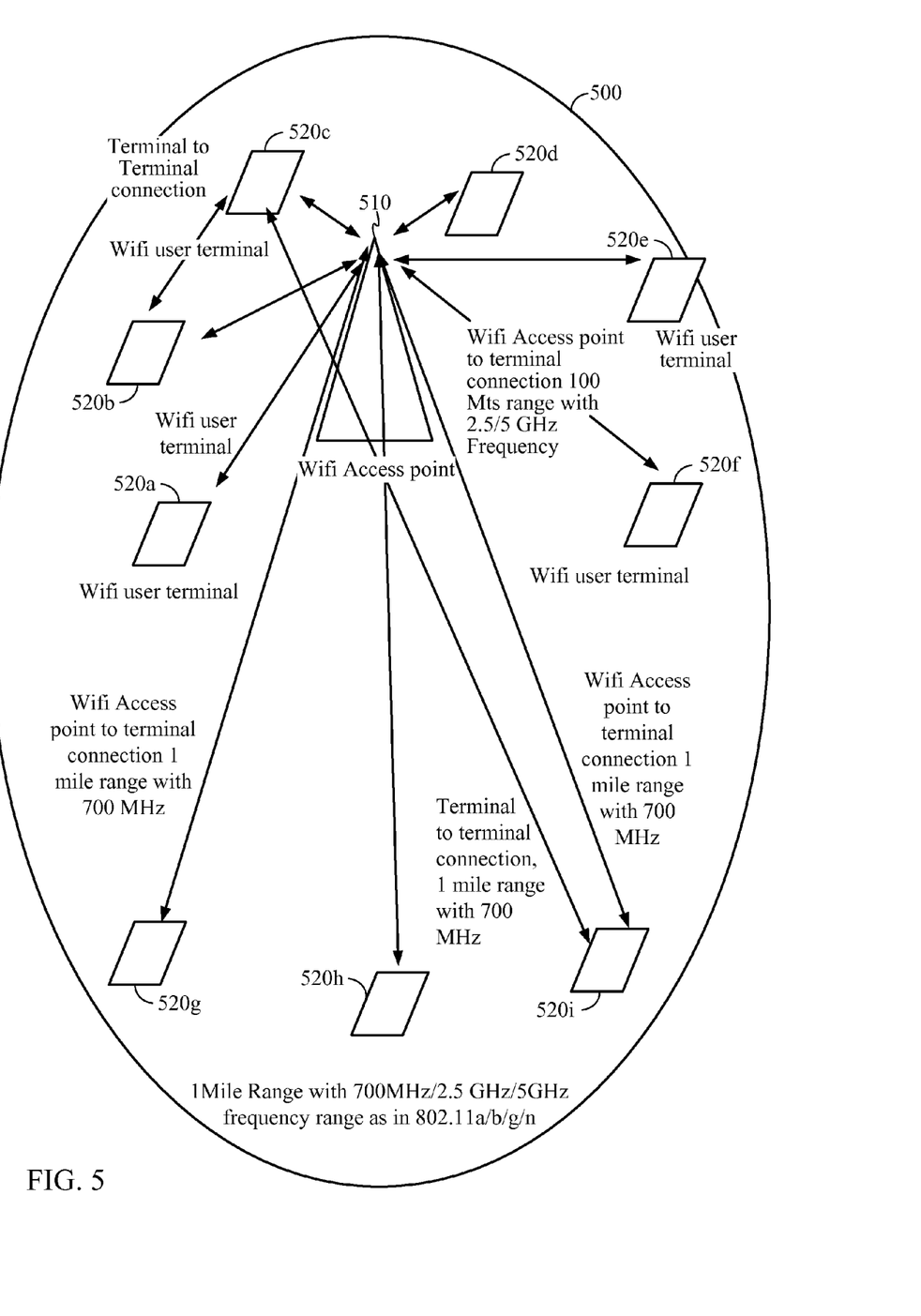
FIG. 5 illustrates a portion of a communications system that comprises a WiFi access point and a plurality of WiFi user terminals that operate within a range of one mile using principles according to the present work.

FIG. 5 illustrates a portion of a communications system 500 that comprises a WiFi access point 510 and a plurality of WiFi user terminals 520 (individually WiFi user terminals 520a through 520i) that operate using the principles of the present work. The WiFi access point 510 and the plurality of WiFi user terminals 520 communicate within a range of one (1) mile using the principles of the present work. As shown in FIG. 5, the WiFi access point 510 communicates with the WiFi user terminals (520a through 520f) that are located within the one hundred meter (100 m) range with a 2.5 GHz frequency or a 5 GHz frequency as described in the specifications IEEE 802.11a/b/g/n. The WiFi access point 510 also communicates with the WiFi user terminals (520g through 520i) that are located at a distance that is greater than one hundred meters (100 m) but within the one (1) mile range with a 700 MHz frequency as described in the specifications IEEE 802.11a/b/g/n.

The WiFi access point 510 comprises a WiFi modem 200 of the present work of the type shown in FIG. 2. As previously described, the connection manager 210 of the WiFi modem 200 operates to assign a sub-carrier to the wireless links based on a value of the distance/range of the wireless link. When the WiFi access point 510 determines that a WiFi user terminal is located at a distance of one hundred meters (100 m) or less (e.g. WiFi user terminal 520f), the 2.5 GHz frequency or the 5 GHz frequency is assigned. When the WiFi access point 510 determines that a WiFi user terminal is located at a distance that is greater than one hundred meters (100 m) but no greater than one (1) mile (e.g., WiFi user terminal 520i), the 700 MHz frequency is assigned.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present work.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside on an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the present work. Thus, the present work is not intended to be limited to the embodiments shown herein but is to be accorded the widest scope consistent with the principles and novel features disclosed herein.

What is claimed is:

1. A method for performing spectral allocation for a wireless link in a wireless communication system wherein the method comprises the steps of:
   determining, with a modem, a distance/range for the wireless link; and
   assigning a sub-carrier to the wireless link based on a value of the distance/range of the wireless link, and in accordance with a prioritization rule that requires assignment of a higher frequency sub-carrier to take priority over assignment of a lower frequency sub-carrier.

2. The method as set forth in claim 1 further comprising the step of:
   assigning a high frequency sub-carrier to the wireless link when the wireless link has a low value of distance/range.

3. The method as set forth in claim 2 wherein the high frequency sub-carrier has a frequency of approximately two and one half Gigahertz and the low value of distance/range has a value of approximately one hundred meters.

4. The method as set forth in claim 2 wherein the high frequency sub-carrier has a frequency of approximately five Gigahertz and the low value of distance/range has a value of approximately one hundred meters.

5. The method as set forth in claim 1 further comprising the step of:
   assigning a low frequency sub-carrier to the wireless link when the wireless link has a high value of distance/range.

6. The method as set forth in claim 5 wherein the low frequency sub-carrier has a frequency of approximately seven hundred Megahertz and the high value of distance/range has a value of approximately one mile.

7. The method as set forth in claim 1 further comprising selecting a plurality of sub-carriers to which said prioritization rule is applied, wherein a sub-carrier chosen to be a highest frequency sub-carrier among said plurality of sub-carriers is identified based on said distance/range.

8. A method for performing spectral allocation for a wireless link in a wireless communication system wherein the method comprises the steps of:
   determining, with a modem, a distance/range for the wireless link; and selecting a plurality of sub-carriers to be input to a sub-carrier assignment process that assigns one of the plurality of sub-carriers to the wireless link based on Channel Impulse Response (CIR) information, wherein a sub-carrier chosen to be a highest frequency sub-carrier among said plurality of sub-carriers is identified based on said distance/range.

9. The method as set forth in claim 8 wherein the sub-carrier assignment process comprises the steps of:
assigning a reference sub-carrier frequency as a high frequency sub-carrier;
determining a value of Channel Impulse Response (CIR) for the reference sub-carrier frequency for the distance/range;
determining if the value of Channel Impulse Response (CIR) for the reference sub-carrier frequency is an acceptable value; and
in response to determining that the value of the Channel Impulse Response (CIR) for the reference sub-carrier frequency an acceptable value, assigning the reference sub-carrier frequency to the wireless link.

10. The method as set forth in claim 9 further comprising the steps of:
in response to determining that the value of the Channel Impulse Response (CIR) of the reference sub-carrier frequency is not an acceptable value, determining if a lower frequency sub-carrier is available;
in response to determining that a lower frequency sub-carrier is available, changing the reference sub-carrier frequency to that of the lower frequency sub-carrier to obtain a new reference sub-carrier frequency; and
determining a value of Channel Impulse Response (CIR) for the new reference sub-carrier frequency for the distance/range;
determining if the value of Channel Impulse Response (CIR) is an acceptable value; and
in response to determining that the value of the Channel Impulse Response (CIR) is an acceptable value, assigning the new reference sub-carrier frequency to the wireless link.

11. An apparatus for performing spectral allocation for a wireless link in a wireless communication system wherein the apparatus comprises:
means for determining a distance/range for the wireless link; and
means for assigning a sub-carrier to the wireless link based on a value of the distance/range of the wireless link, and in accordance with a prioritization rule that requires assignment of a higher frequency sub-carrier to take priority over assignment of a lower frequency sub-carrier.

12. The apparatus as set forth in claim 11 wherein the means for assigning a sub-carrier to the wireless link comprises:
means for assigning a high frequency sub-carrier to the wireless link when the wireless link has a low value of distance/range; and
means for assigning a low frequency sub-carrier to the wireless link when the wireless link has a high value of distance/range.

13. The apparatus as set forth in claim 11:
wherein said means for assigning includes means for selecting a plurality of sub-carriers to which said prioritization rule is applied, and wherein a sub-carrier chosen to be a highest frequency sub-carrier among said plurality of sub-carriers is identified based on said distance/range.

14. The apparatus as set forth in claim 13 wherein said means for providing provides an optimal frequency band to a radio frequency transceiver.

15. A computer program product for performing spectral allocation for a wireless link in a wireless communication system comprising:
a computer-readable medium comprising:
code for causing at least one data processor to determine a distance/range for the wireless link; and
code for causing the at least one data processor to assign a sub-carrier to the wireless link based on a value of the distance/range of the wireless link, and in accordance with a prioritization rule that requires assignment of a higher frequency sub-carrier to take priority over assignment of a lower frequency sub-carrier.

16. The computer program product as set forth in claim 15 wherein the computer-readable medium further comprises:
code for causing the at least one data processor to assign a high frequency sub-carrier to the wireless link when the wireless link has a low value of distance/range and to assign a low frequency sub-carrier to the wireless link when the wireless link has a high value of distance/range.

17. The computer program product as set forth in claim 16 wherein the computer-readable medium further comprises:
code for causing the at least one data processor to select a plurality of sub-carriers to which said prioritization rule is applied, wherein a sub-carrier chosen to be a highest frequency sub-carrier among said plurality of sub-carriers is identified based on said distance/range.

18. The computer program product as set forth in claim 15 wherein the computer-readable medium further comprises:
code for causing the at least one data processor to select a plurality of sub-carriers to which said prioritization rule is applied, wherein a sub-carrier chosen to be a highest frequency sub-carrier among said plurality of sub-carriers is identified based on said distance/range; and
code for causing the at least one data processor to assign the sub-carrier to the wireless link based on Channel Impulse Response (CIR) information.

19. The computer program product as set forth in claim 18 wherein the computer-readable medium further comprises:
code for causing the at least one data processor to assign a reference sub-carrier frequency as a high frequency sub-carrier;
code for causing the at least one data processor to determine a value of Channel Impulse Response (CIR) for the reference sub-carrier frequency for the distance/range;
code for causing the at least one data processor to determine if the value of Channel Impulse Response (CIR) for the reference sub-carrier frequency is an acceptable value; and
in response to determining that the value of the Channel Impulse Response (CIR) for the reference sub-carrier frequency an acceptable value, code for causing the at least one data processor to assign the reference sub-carrier frequency to the wireless link.

20. The computer program product as set forth in claim 19 wherein the computer-readable medium further comprises:
in response to determining that the value of the Channel Impulse Response (CIR) of the reference sub-carrier frequency is not an acceptable value, code for causing the at least one data processor to determine if a lower frequency sub-carrier is available;
in response to determining that a lower frequency sub-carrier is available, code for causing the at least one data processor to change the reference sub-carrier frequency to that of the lower frequency sub-carrier to obtain a new reference sub-carrier frequency;

code for causing the at least one data processor to determine a value of Channel Impulse Response (CIR) for the new reference sub-carrier frequency for the distance/range;

code for causing the at least one data processor to determine if the value of Channel Impulse Response (CIR) is an acceptable value; and in response to determining that the value of the Channel Impulse Response (CIR) is an acceptable value, code for causing the at least one data processor to assign the new reference sub-carrier frequency to the wireless link.

* * * * *